May 30, 1933. G. BROWN 1,911,881
MEANS FOR NULLIFYING OR REDUCING WINDOW REFLECTIONS
Filed April 13, 1931
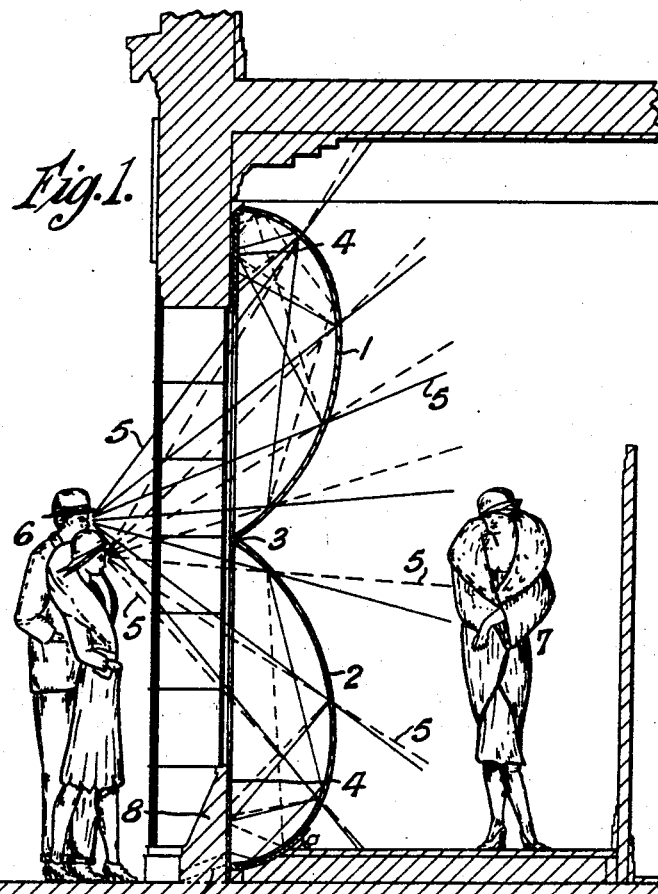
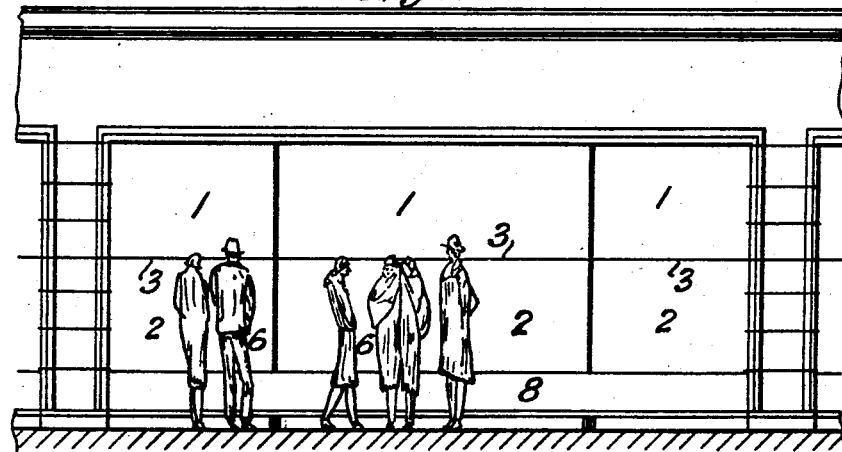

Patented May 30, 1933

1,911,881

UNITED STATES PATENT OFFICE

GERALD BROWN, OF BARNES, LONDON, ENGLAND

MEANS FOR NULLIFYING OR REDUCING WINDOW REFLECTIONS

Application filed April 13, 1931, Serial No. 529,768, and in Great Britain July 23, 1930.

This invention relates to means for nullifying or reducing window reflections and is particularly applicable to shop windows behind which goods are to be displayed.

Great inconvenience has been caused particularly in shops whose depth is considerable, as in showrooms for example, owing to the fact that external reflections on the glass window are so pronounced that the goods displayed cannot be seen properly from the outside.

The object of the invention is to provide means whereby troublesome reflections are avoided.

It has heretofore been proposed to form a shop front of a sheet of glass which is curved out of the vertical plane, the concave side of the glass facing the objects or lights of which reflections are not desired the effect being to deflect reflections of objects or lights facing its concave side from the point of view of an observer facing the said concave side and so provide a surface which at or about normal eye level is non-reflecting. The curve of the glass may be irregular, that is to say, the glass may be made up of two or more curves merging into one another.

According to the present invention a window comprises two continuous curved panes of glass or the like converging together at or about the normal eye level of an observer and so arranged as to take the field of reflected view away from the ordinary outside objects to regions, e. g. light absorbing surfaces or surfaces of uniformly low luminosity providing no objectionable reflections. This can be effected by forming the window in a double curve, concave to the front, with a cusp at or about normal eye level.

Preferably the field of reflected view is led to light absorbing surfaces incorporated in the window structure and positioned in front of the window at the top and at the bottom.

It will be seen that with such an arrangement the light absorbing surfaces are reflected all over the field of the curved panes of glass to such an extent that to the observer the curved panes of glass are practically invisible.

The invention is illustrated in the accompanying drawing in which Figure 1 is a vertical section through a shop front window and Figure 2 a front view to a smaller scale.

Referring to the drawing the window is formed of two curved panes of glass 1, 2, which converge to a cusp at 3 about the normal eye level of an observer the concave surfaces of the panes 1, 2, facing the observer. At both the upper and lower extremities of the panes of glass 1, 2, is arranged a light absorbing surface 4 extending vertically from the extremity, so that the field of reflected view is directed from the panes of glass 1, 2, on to the light absorbing surfaces 4.

It will be seen from the sketching of the light paths 5, that with such a construction the reflected field of view of the observers is wholly at the light absorbing surfaces 4, so that no objectionable reflections can be seen. It is therefore possible with such a construction for an observer 6 to look straight through the window and see any goods, e. g. a model 7 displayed behind it, without any annoyance caused by reflection.

The bottom structure 8 may also be provided with drainage holes 9 passing through the lower light absorbing surface 4, for draining away any rain water which otherwise might collect between the pane of glass 2 and the light absorbing surface 4.

Such a construction has the advantage that whilst there is no objectionable reflection, the window takes up only a relatively small amount of floor space and can quite easily be kept clean.

What I claim is:—

1. A shop front window comprising two continuous curved transparent panes in combination with light absorbing surfaces positioned in front of the window at the top and at the bottom in substantially a vertical plane and providing no objectionable reflections, said panes converging together at about the normal eye-level of an observer and being so arranged as to take the field of reflected view away from ordinary outside objects to said light absorbing surfaces.

2. A shop front window comprising two continuous curved transparent panes formed in a double curve concave to the front in combination with light absorbing surfaces positioned in front of the window at the top and at the bottom in substantially a vertical plane and providing no objectionable reflections, said panes converging together in the form of a cusp at about the normal eye-level of an observer and being so arranged as to take the field of reflected view away from ordinary outside objects to said light absorbing surfaces.

3. A shop front window comprising two continuous curved transparent panes in combination with two light absorbing surfaces providing no objectionable reflections and being arranged in substantially a vertical plane so that no direct light from without the window can fall thereon, said panes being formed in a double curve concave to the front and converging together in the form of a cusp so as to take the field of reflected view away from ordinary outside objects to said light absorbing surfaces.

4. In a display window, the combination of two reversely positioned objectionable reflection nullifying units each comprising a light absorbing surface disposed substantially vertically out of the direct line of vision of persons standing before the window and out of position for receiving light directly from without the window, and a continuous curved transparent pane starting at about the normal eye-level of an observer and approximately in the plane of said surface and terminating in close proximity to said surface eliminating substantial space intervening between said pane and surface, all being arranged whereby said pane will direct the field of reflected view onto said surface, the panes of said units merging in a common starting point in the form of a cusp.

5. In a display window, the combination of two reversely positioned objectionable reflection nullifying units each comprising a light absorbing surface disposed out of the direct line of vision of persons standing before the window and out of position for receiving light directly from without the window, and a continuous curved transparent pane disposed relatively to said surface and the line of vision of an observer for directing the field of reflected view onto said surface, the panes of the units merging in the form of a cusp at about the normal eye-level of an observer.

6. In a display window, the combination of a light absorbing surface disposed substantially vertically out of the direct line of vision of persons standing before the window and out of position for receiving light directly from without the window, and a continuous curved transparent pane starting at about the normal eye-level of an observer and approximately in the plane of said surface and terminating in close proximity to said surface eliminating substantial space intervening between said pane and surface, all being arranged whereby said pane will direct the field of reflected view onto said surface.

7. In a display window, the combination of a surface of low luminosity providing no objectionable reflections disposed substantially vertically out of the direct line of vision of persons standing before the window and out of position for receiving light directly from without the window, and a continuous curved transparent pane starting at about the normal eye-level of an observer and approximately in the plane of said surface and terminating in close proximity to said surface eliminating substantial space intervening between said pane and surface, all being arranged whereby said pane will direct the field of reflected view onto said surface.

8. In a display window, the combination of a supporting wall defining the front of the window, a light absorbing surface disposed substantially vertically behind said wall out of the direct line of vision of persons standing before the window and out of position for receiving light directly from without the window, and a continuous curved transparent pane starting at about the normal eye-level of an observer and approximately in the plane of said surface and terminating against said surface, all being arranged whereby said pane will direct the field of reflected view onto said surface, said wall having drain apertures passing therethrough at the point of termination of said pane.

In testimony that I claim the foregoing as my invention I have signed my name this 30th day of March, 1931.

GERALD BROWN.